Oct. 24, 1944.  E. E. HOOD  2,361,031
METALLIC BRAKE MATERIAL
Filed Aug. 25, 1942
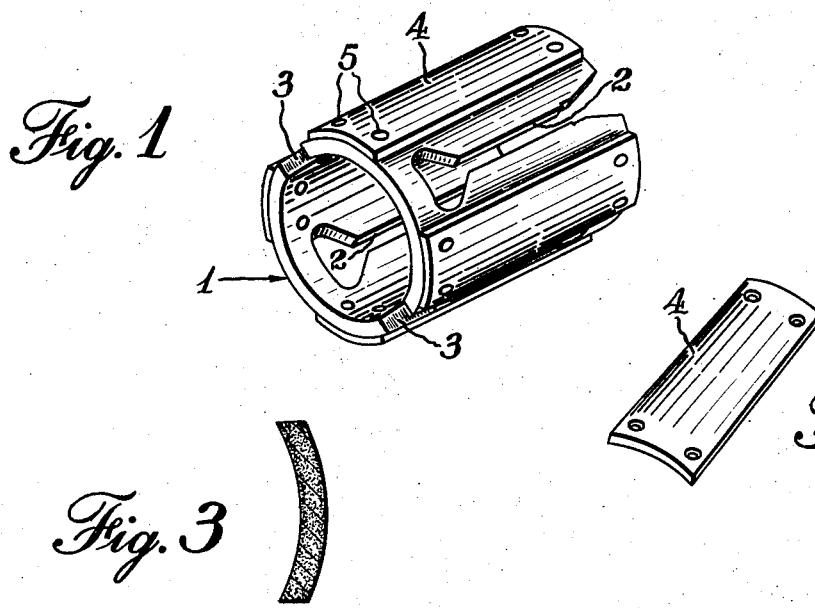
Fig. 1
Fig. 2
Fig. 3
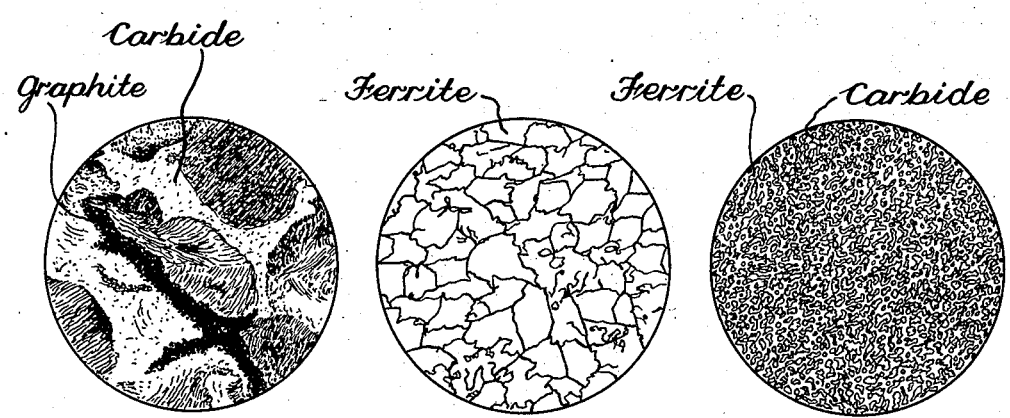
Fig. 4
Fig. 5
Fig. 6
Witness:
Burr W. Jones
INVENTOR.
E. Elliott Hood
BY
Clinton S. Janes
ATTORNEY Patented Oct. 24, 1944

2,361,031

UNITED STATES PATENT OFFICE 2,361,031

METALLIC BRAKE MATERIAL

E. Elliott Hood, Elmira, N. Y., assignor to Bendix Aviation Corporation, South Bend, Ind., a corporation of Delaware Application August 25, 1942, Serial No. 456,021

5 Claims. (Cl. 148—12)

The present invention relates to metallic brake material and more particularly to a metallic composition especially adapted for the manufacture of brake bands, shoes and the like, and a method of making the same.

In certain types of machine it is necessary to provide braking elements which have a large braking capacity in relation to their size, and which have sufficient flexibility and structural strength to withstand the necessary deformation without disintegration. Thus, in coaster brakes for bicycles various metallic substances have been used for the brake members which have combined in varying degrees the desirable properties of efficient braking, mechanical strength, resistance to heat, economy and facility of manufacture.

It is an object of the present invention to provide a novel brake material which is particularly efficient as a braking element while being sufficiently tough and flexible to deform in the application of the brake without mechanical failure.

It is another object to provide such a material which retains its efficiency at comparatively high temperatures.

It is another object to provide such a material which will not tear, crack or crumble in use, nor score or adhere to a cooperating brake element.

It is another object to provide such a material which is inexpensive and easily worked.

It is another object to provide a novel method of making brake members having the above stated characteristics.

Further objects and advantages will be apparent from the following description taken in connection with the accompanying drawing, in which:

Fig. 1 is a perspective view of the brake sleeve of a commercial type of bicycle coaster brake incorporating the present invention;

Fig. 2 is a detail in perspective of one brake shoe for attachment to the brake sleeve of Fig. 1;

Fig. 3 is an enlarged sectional view of the brake shoe illustrated in Fig. 2;

Fig. 4 is a reproduction of a photomicrograph of a sample of commercial cast iron as commonly used for braking purposes, enlarged 500 dia.;

Fig. 5 is a similar photomicrograph of a preferred form of raw stock from which applicant's braking material is prepared; and Fig. 6 is a similar photomicrograph of braking material made in accordance with applicant's invention.

In Fig. 1 of the drawing there is illustrated a brake sleeve of the type disclosed in the patent to Kurzina 2,189,956, said sleeve comprising a cylindrical body 1 provided with pairs of oppositely arranged slots 2, 3 extending inwardly from each end of the sleeve and circumferentially spaced so as to permit expansion of the sleeve for the purpose of applying the brake. Brake shoes 4 are fixed to the sleeve 1 as by means of rivets 5, said shoes being arranged to be moved by the expansion of the sleeve 1 into frictional braking engagement with the interior of a bicycle hub in which the brake is mounted as shown in the Kurzina patent referred to.

It will be understood that inasmuch as the radius of the brake sleeve is small in comparison with the bicycle wheel in which it is mounted, and the braking surfaces are not large, special problems are involved in providing a braking material having proper braking capacity which will not score the interior of the hub nor disintegrate due to localized pressure, heat and flexure.

It is of course well known to employ cast iron as a braking material for heavy duty installations such as railway brakes, and this material, by virtue of its granular surface, is satisfactory in so far as braking capacity is concerned. When it is attempted to use such material in the form of brake illustrated, however, it is found that cast iron is too brittle and crumbly for satisfactory operation. This will be easily appreciated by reference to the photomicrograph of cast iron structure (Fig. 4) which shows comparatively large irregular grains of iron carbide with large flakes of graphite interspersed therebetween. The large grains, and more particularly the free graphite, form places of weakness in the material where fractures are liable to start when the material is flexed. Cast iron therefore can only be used as a braking material where the brake elements are large and heavy, and the structural strength thereby made adequate for the purpose.

According to the present invention, applicant has provided a material which combines in an enhanced degree the advantageous granular structure comparable to that of cast iron for a braking surface, with a body of comparatively soft tough metal capable of withstanding the required flexure without failure. This is preferably accomplished by utilizing as the raw material for the brake shoe 4 a soft low carbon steel, such, for instance, as is known commercially as SAE 1010 which is worked into the desired shape by any suitable means such as by pressing or stamping the shoes from a strip of such material. A characteristic photomicrograph enlarged 500 dia. of this material is reproduced in Fig. 5. It will be seen that the material is almost pure ferrite with small amounts of carbide bounding the grains of ferrite. This material is soft and tough and will stand considerable deformation without failure.

The brake shoes so formed are then subjected to a carburizing operation whereby the external surface of the shoe absorbs carbon which combines with the iron forming iron carbide particles which diffuse inwardly from said surface as indicated in Fig. 3. When the carburizing operation has progressed sufficiently, the brake members are removed from the carburizing furnace, or optionally, the temperature of the furnace is reduced sufficiently to inhibit the carburizing action.

The granular structure desired for the braking surface as above pointed out is then provided by a spheroidizing operation involving holding the parts for an extended period at a temperature below the carburizing range, but sufficiently high for the surface tension of the carbide grains to be effective to gradually change their shape toward a globular form. This operation causes the grains of carbide to agglomerate and become spheroidal or rounded, while the matrix of ferrite grains is consolidated and rendered soft and free from brittleness, thereby forming a braking surface which will not score or tear the cooperating brake member.

The appearance of the brake material after being carburized and spheroidized is shown in the photomicrograph reproduced in Fig. 6 where it will be seen that the surface is composed of rounded granules of the hard iron carbide diffused throughout a matrix of soft ferrite.

Specifically, applicant secures the above result by heating SAE. 1010 steel having a thickness of about $\frac{1}{16}$" for four hours at a temperature of 1700° Fahrenheit in the presence of carbon in the form of a carburizing compound containing coke and energized charcoal. The shoes so carburized are then spheroidized by heating for eight hours at a temperature of 1250° Fahrenheit and the brake members are then allowed to cool. The steel so treated is found to be composed of alpha iron or ferrite, with hard spheroidized grains of carbide embedded in the soft tough ferrite as illustrated in Fig. 6.

If, as may happen in some instances, it be desired to have the brake members of substantially uniform composition throughout, this may readily be provided by utilizing as raw material a steel having the desired carbon content, such as a spring steel. The carburizing operation then becomes unnecessary, and the formed brake member is simply spheroidized as above set forth, to produce the desired braking surface.

It will be understood that in the above description of the invention, applicant has stated what he now believes to be the physical and chemical changes brought about by his process, and the explanation of the superior results secured thereby. Since, however, said results are secured in practice by following the method set forth irrespective of reliance on any theory of action, the utility of the invention is not dependent on the correctness of said explanation.

Although certain specific raw materials and operating conditions have been disclosed, it will be understood that these are not exclusive and deviations therefrom may be allowed for the purpose of varying the final result in respect to depth of carburization, size of grains, etc., without departing from the spirit of the invention as defined in the claims appended hereto.

What is claimed is:

1. A frictional brake member, the frictional surface of which comprises a homogeneous mass of soft tough metal with hard spheroidal granules diffused therein.

2. A frictional brake member comprised mainly of soft iron with spheroidal granules of iron carbide dispersed therein.

3. A frictional brake member comprising a body of low carbon steel with spheroidized grains of iron carbide superficially diffused therein.

4. In a method of making a friction brake member from soft low carbon steel, the steps of carburizing the steel to diffuse comparatively hard grains of iron carbide in the braking surface, and spheroidizing the carburized steel to agglomerate the carbide grains and render them globular in form.

5. In a method of making brake members from soft steel strip stock, the steps of cutting and forming the shoes, carburizing the members at a temperature of from 1600 Fahrenheit to 1750° Fahrenheit for three to six hours, and spheroidizing the carburized members by maintaining them at a temperature of from 1200° Fahrenheit to 1300° Fahrenheit for six to ten hours.

E. ELLIOTT HOOD.